(12) United States Patent
Ryu

(10) Patent No.: US 12,442,187 B2
(45) Date of Patent: Oct. 14, 2025

(54) TRUSS STRUCTURE MEMBER HAVING ASSEMBLY HOLE AND STRUCTURE USING SAME

(71) Applicant: Byung Sue Ryu, Seoul (KR)

(72) Inventor: Byung Sue Ryu, Seoul (KR)

( * ) Notice: Subject to any disclaimer, the term of this patent is extended or adjusted under 35 U.S.C. 154(b) by 0 days.

(21) Appl. No.: 18/729,733

(22) PCT Filed: Sep. 5, 2022

(86) PCT No.: PCT/KR2022/013273
§ 371 (c)(1),
(2) Date: Feb. 4, 2025

(87) PCT Pub. No.: WO2023/140452
PCT Pub. Date: Jul. 27, 2023

(65) Prior Publication Data
US 2025/0163700 A1    May 22, 2025

(30) Foreign Application Priority Data
Jan. 18, 2022  (KR) .................. 10-2022-0007043

(51) Int. Cl.
*E04H 12/00* (2006.01)
*E04C 3/08* (2006.01)
*E04C 3/04* (2006.01)

(52) U.S. Cl.
CPC ........ *E04C 3/08* (2013.01); *E04C 2003/0413* (2013.01); *E04C 2003/0486* (2013.01)

(58) Field of Classification Search
CPC ............... E04C 2003/0486; E04C 3/08; E04C 2003/0413
See application file for complete search history.

(56) References Cited

U.S. PATENT DOCUMENTS

| 377,887 A | * | 2/1888 | Brochocki | ................ E01D 6/00 14/4 |
| 488,349 A | * | 12/1892 | Bradley | .................... E04B 1/19 126/30 |
| 3,744,206 A | * | 7/1973 | Nelson | ...................... E04B 1/19 52/646 |
| 4,646,552 A | * | 3/1987 | Kanbe | ...................... F16D 3/40 29/896.7 |
| 4,655,021 A | * | 4/1987 | Franchin | ................... E04B 1/19 52/693 |
| 4,765,114 A | * | 8/1988 | Wesselski | ............. B64G 99/00 52/646 |

(Continued)

FOREIGN PATENT DOCUMENTS

JP    2794422 B2    9/1998
JP    2004-027634 A    1/2004
(Continued)

*Primary Examiner* — Basil S Katcheves
(74) *Attorney, Agent, or Firm* — Maschoff Brennan

(57) ABSTRACT

The present invention relates to a truss structure member having an assembly hole with a tapered extension portion and a structure using same, and provides a truss structure member and a structure, the truss structure member being capable of enabling a truss structure member and a truss structure member or a truss structure member and a connection member to be firmly fastened to each other without clearance even when a gap is generated between a fastening tool and the assembly hole.

7 Claims, 11 Drawing Sheets

(56) References Cited

U.S. PATENT DOCUMENTS

| | | | | |
|---|---|---|---|---|
| 4,770,584 | A * | 9/1988 | Vinciguerra | D03C 1/00 411/389 |
| 4,827,688 | A * | 5/1989 | Tene | E04C 3/16 52/696 |
| 4,907,390 | A * | 3/1990 | Tene | E04C 3/16 52/696 |
| 4,957,403 | A * | 9/1990 | Corain | F16B 43/009 411/368 |
| 6,065,267 | A * | 5/2000 | Fisher | E04C 3/08 52/693 |
| 7,311,493 | B2 * | 12/2007 | Remy | F16B 43/001 415/185 |
| 7,347,030 | B2 * | 3/2008 | Lewison | E04C 3/08 52/693 |
| 8,641,312 | B2 * | 2/2014 | Todd, IV | E04H 3/28 403/165 |
| 8,739,492 | B2 * | 6/2014 | Hawkins | E04B 1/1909 52/655.1 |
| 10,760,263 | B2 * | 9/2020 | Hossler | E04B 1/388 |
| 11,988,415 | B2 * | 5/2024 | Werner | F24S 30/425 |
| 2002/0184847 | A1 * | 12/2002 | Shoji | E04C 3/08 52/693 |
| 2006/0080931 | A1 * | 4/2006 | Ollman | E04C 3/09 52/694 |
| 2007/0028554 | A1 * | 2/2007 | Ferrell | E04B 9/068 52/506.07 |

FOREIGN PATENT DOCUMENTS

| | | |
|---|---|---|
| JP | 2008-214915 A | 9/2008 |
| KR | 10-1427764 B1 | 8/2014 |
| KR | 10-1577618 B1 | 12/2015 |
| KR | 10-2408107 B1 | 6/2022 |

\* cited by examiner

TRUSS STRUCTURE MEMBER HAVING ASSEMBLY HOLE AND STRUCTURE USING SAME

TECHNICAL FIELD

The present invention relates to a truss structure member having an assembly hole with a tapered extension portion and a structure using the same, and more particularly, to truss structure members and a structure constructed using the same, wherein ends of the truss structure members are coupled to each other to form a truss structure in which the end is formed with a flat flange portion, the flange portion is formed with an assembly hole through which a fastening tool passes, a tapered extension portion having a ring structure is formed around the assembly hole, and accordingly, the tapered extension portions are overlapped and coupled to each other when the ends are coupled to each other to form the truss structure, so that a load endurable by the assembly hole can be increased by dispersing the applied stress without any clearance.

BACKGROUND ART

In general, truss structures are configured that a plurality of bar-shaped truss structure members are repeatedly coupled to each other to form a triangular structure, thereby forming a predetermined skeletal structure, and are used to construct large structures such as bridges.

The truss structure member for forming the truss structure is formed in a bar shape, and an end of the truss structure member has a bolt hole installed thereto with a bolt for coupling a truss structure member to another truss structure member or fixing the truss structure member to a target object.

In addition, in order to couple truss structure members having the bolt holes formed at ends thereof, respectively, to each other, the two truss structure members are arranged so that the bolt holes formed at the ends of the two truss structure members match each other, a bolt is arranged to pass through the two bolt holes, and then a nut is fastened to an end of the bolt passing and protruding through the two bolt holes, so that the two truss structure members are coupled and fixed to each other.

In order to smoothly perform a work of coupling the truss structure members to each other by installing the bolts to the bolt hole formed at the ends of the truss structure members in the above manner, a diameter of the bolt hole may be sufficiently larger than a diameter of the bolt, so that a bolt installation work may be easily performed even during working environments in which it is difficult to ensure a stable posture for the bolt installation work.

However, when the diameter of the bolt hole is larger than the diameter of the bolt, a gap G is formed between a bolt hole 11 and a bolt 20 due to a difference in diameter between the bolt hole 11 and the bolt 20, and the truss structure member 10 may be moved within a range of the gap G, and accordingly, the truss structure members cannot be firmly coupled by simply fastening bolts and nuts.

Moreover, as can be seen in FIGS. 1 and 2, when the bolt 20 arranged to pass through the bolt hole 10 comes into contact with the bolt hole 10 while being pushed in one direction of the bolt hole 10, a contact area between a surface of the bolt 20 and an inside of the bolt hole 10 is small, so a concentrated load is applied onto the corresponding portion, thereby causing deformation. When a component is deformed and cannot be reusable, replacement costs for the component may be increased due to non-reusability of the component, and stability of the truss structure may be deteriorated due to clearance.

Thus, the truss structure members in the related art are configured to have a bolt hole formed in a sufficiently large size in consideration of the convenience for the bolt installation work. However, the truss structure members may fail to be firmly fastened without clearance due to the bolt hole having an inner diameter larger than the diameter of the bolt, and accordingly, problems of structural defects and concentrated stress in a truss structure may be caused.

DOCUMENT OF RELATED ART

Patent Document (Patent Document 1) Korean Patent Registration No. 10-1427764 (Published on Aug. 8, 2014)

DISCLOSURE

Technical Problem

The present invention is provided to solve the above conventional problems, and an object of the present invention is to provide a truss structure member and a structure, the truss structure member being capable of enabling a truss structure member and a truss structure member or a truss structure member and a connection member to be firmly fastened to each other without clearance even when a gap is generated between a fastening tool and an assembly hole.

Another object of the present invention is to provide a truss structure member and a structure in which a stress resistance at a joint between a truss structure member and a truss structure member or between a truss structure member and a connection member is improved, so that a more structurally stable building may be realized, truss structure members may be reusable, and a service life may be significantly increased.

Technical Solution

In order to achieve the above-mentioned objects and perform a task for eliminating the existing defects, the present invention provides a truss structure member having an assembly hole with a tapered extension portion, in which the truss structure members are formed in bar shapes so as to be coupled to each other to form a truss structure having a predetermined form, a flange portion having a flat structure is formed in at least one of both ends of the truss structure member, an assembly hole through which a fastening tool passes is formed in the flange portion, and a tapered extension portion is formed around the assembly hole.

In addition, in the truss structure member, the tapered extension has a ring structure extending around the assembly hole, and has a sectional surface shaped to protrude with an inclination from vicinity of the assembly hole toward an inside of the assembly hole so as to be an overall conical shape, in which an inclined outer surface of the tapered extension portion comes in close contact with an inclined inner surface of a tapered extension portion formed on another truss structure member, so that the truss structure members may be coupled to each other in a structure without clearance while the tapered extension portions of the truss structure members coupled to each other to form a truss structure are overlapped with each other.

In addition, the present invention provides a structure formed by coupling the truss structure members together to form a predetermined form.

In addition, the structure may further include: a first support member formed in a center thereof with a hole through which a fastening tool passes, formed in a center of one side thereof with a support groove recessed in a conical shape to form an inclined first corresponding surface to come into close contact with an inclined outer surface of the tapered extension portion so as to be formed continuously with the hole, and disposed on a side surface of the flange portion so that the tapered extension portion is inserted into the support groove; and a second support member formed in a center thereof with a hole through which a fastening tool passes, formed in a cone shape to include an inclined second corresponding surface to come into close contact with an inclined inner surface of the tapered extension portion, and disposed on a side surface of the flange portion so that the second corresponding surface comes into close contact with the inner surface of the tapered extension portion.

In addition, in the structure, the fastening tool may include a bolt and a nut, and one of the first support member and the second support member may be integrally formed with a head of the bolt, and an opposite one may be integrally formed with the nut.

In addition, the structure may further include: a connection member including at least two flat surfaces inclined in different directions, in which each of the flat surfaces is integrally formed thereon with a screw pillar passing through the assembly hole of the truss structure member so as to be fastened to the nut, so that the connection member connects at least two truss structure members to each other.

In addition, in the structure, the connection member may include two flat surfaces, in which the two flat surfaces may be symmetrical with respect to a center of the connection member.

In addition, in the structure, the connection member may include three flat surfaces, in which the three flat surfaces may be positioned on sides of a triangle, respectively.

Advantageous Effects

According to the present invention having the above features, when the truss structure members are coupled to each other to form a truss structure, the flange portions formed on the truss structure members come into close contact with each other while facing each other, the tapered extension portions formed around the assembly holes are overlapped and coupled to each other, thereby removing clearance between the truss structure members, so that the truss structure members can be coupled in a sturdy structure, and accordingly, a more structurally stable truss structure can be implemented, and component damage or deformation can be minimized to increase a service life and increase the possibility of reuse.

In addition, the clearance between the truss structure members can be removed without reducing the size of the assembly hole to which the fastening tool is installed, so that the clearance between the truss structure members can be prevented without reducing workability due to reduction of the assembly holes.

Figure 1:
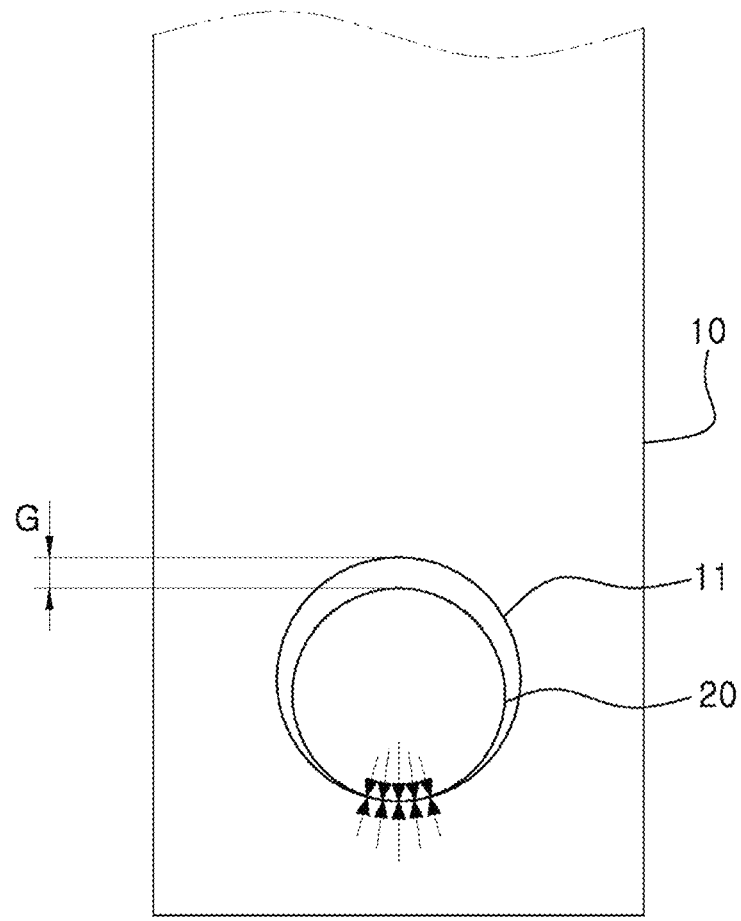
FIG. 1 is an example view showing a state in which a bolt is installed to a bolt hole formed in a conventional truss structure member.
Figure 2:
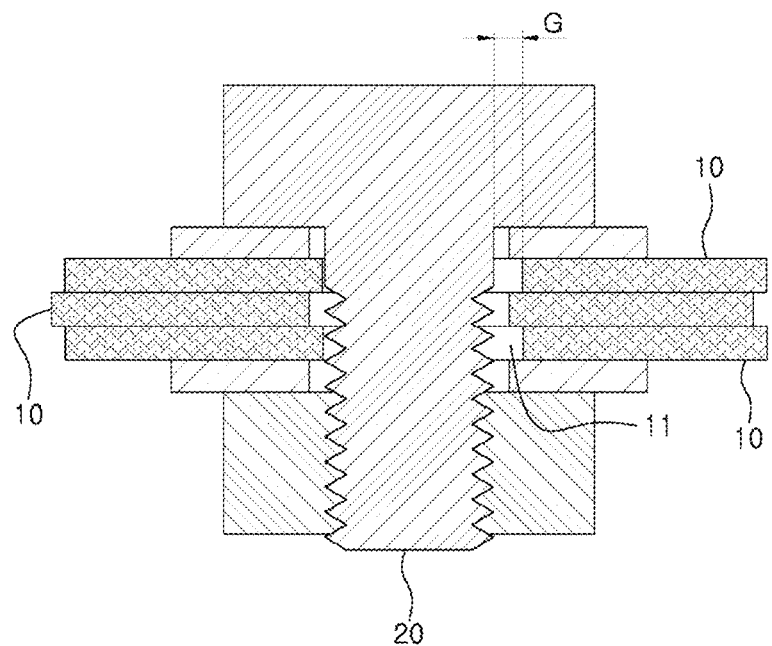
FIG. 2 is a sectional view showing a state in which conventional truss structure members are fastened by a bolt and a nut.

| [Reference Numerals] | |
|---|---|
| 110: Truss structure member | 111: Flange portion |
| 112: Assembly hole | 113: Tapered extension portion |
| 113a: Outer surface | 113b: Inner surface |
| 120: First support member | 121: Hole |
| 122: Support groove | |
| 123: First corresponding surface | |
| 131: Second support member | |
| 132: Second corresponding surface | |
| 140: Fastening tool | 141: Bolt |
| 142: Nut | 150: connection member |
| 151: Flat surface | 152: Screw pillar |

BEST MODE

Hereinafter, a preferred embodiment of the present invention will be described as follows in detail with reference to the accompanying drawings.

MODE FOR INVENTION

In the following description of the embodiments of the present invention, the detailed description of the related known function or configuration incorporated herein will be omitted when it possibly makes the subject matter of the present invention unclear unnecessarily.

Figure 3:
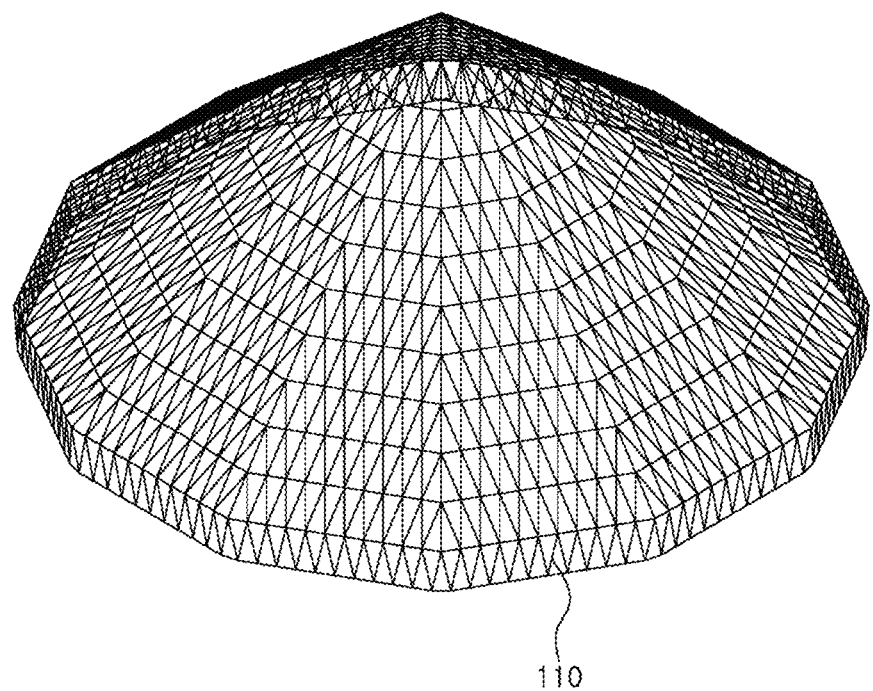
FIG. 3 is a perspective view showing an example of a structure according to the present invention.

FIG. 3 is a perspective view showing an example of a structure according to the present invention.

Figure 4:
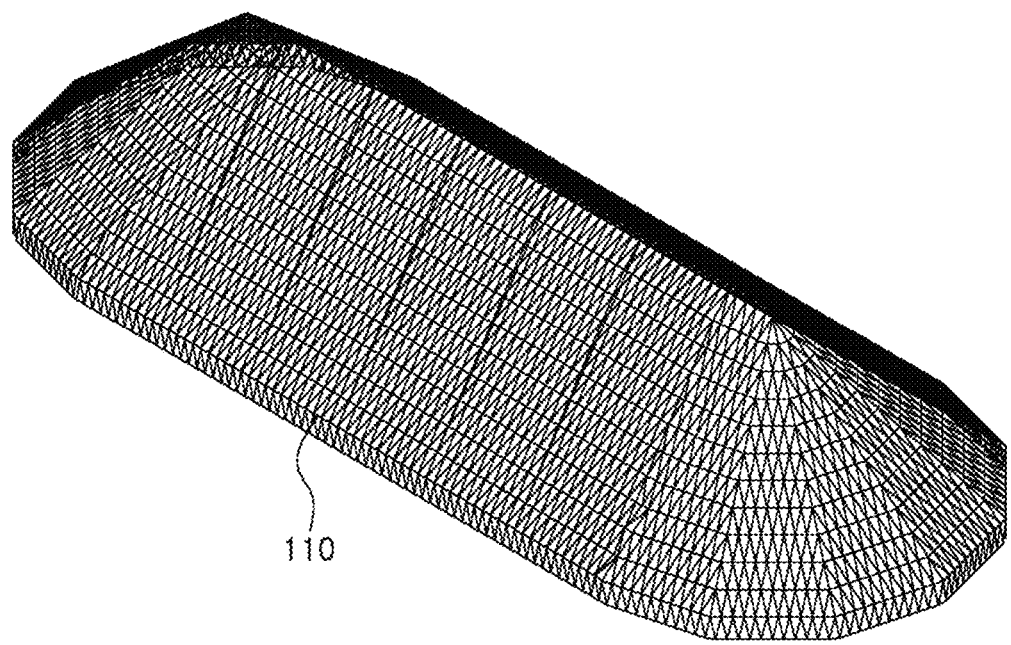
FIG. 4 is a perspective view showing another example of the structure according to the present invention.

FIG. 4 is a perspective view showing another example of the structure according to the present invention.

Figure 5:
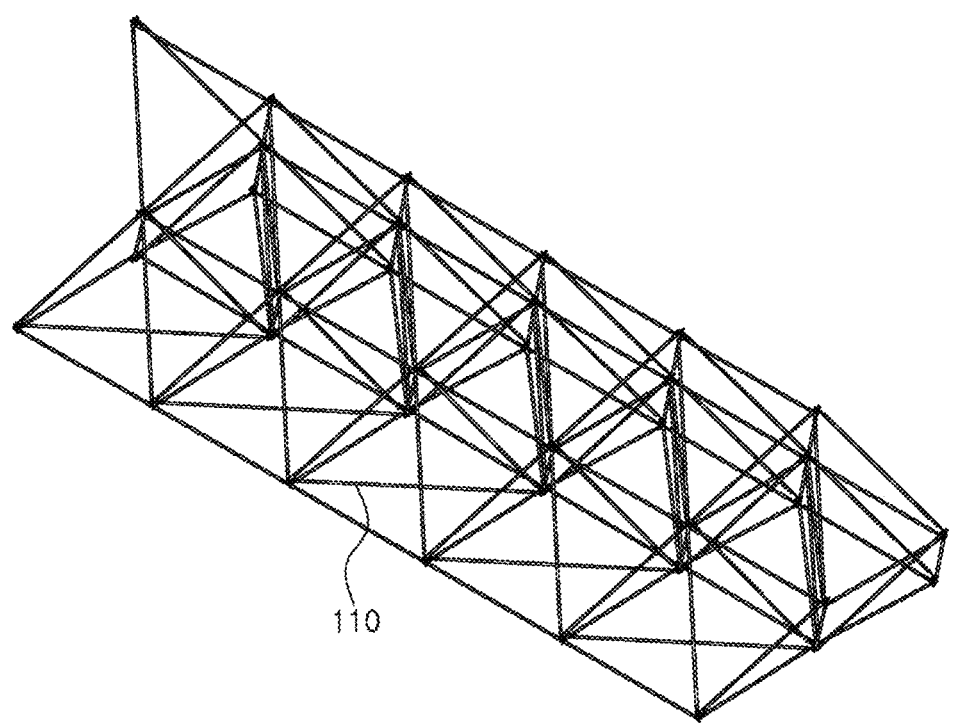
FIG. 5 is a perspective view showing still another example of the structure according to the present invention.

FIG. 5 is a perspective view showing still another example of the structure according to the present invention.

Figure 6:
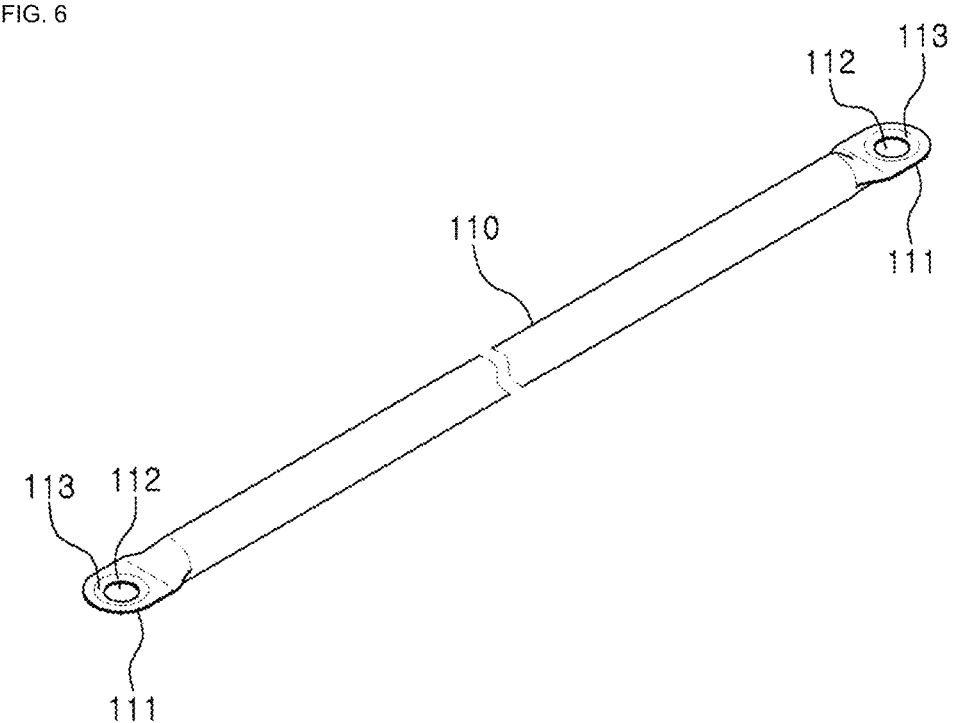
FIG. 6 is a perspective view of a truss structure member according to a preferred embodiment of the present invention.

FIG. 6 is a perspective view of a truss structure member according to a preferred embodiment of the present invention.

Figure 7:
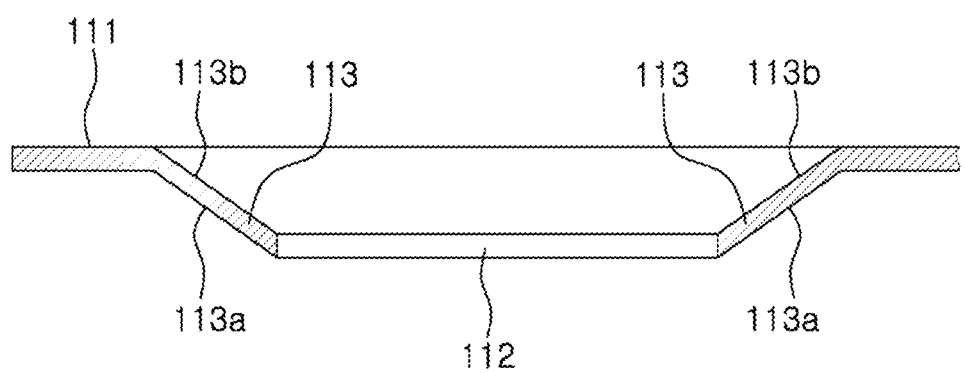
FIG. 7 is a sectional view of a flange portion of a truss structure member according to the preferred embodiment of the present invention.

FIG. 7 is a sectional view of a flange portion of a truss structure member according to the preferred embodiment of the present invention.

Figure 8:
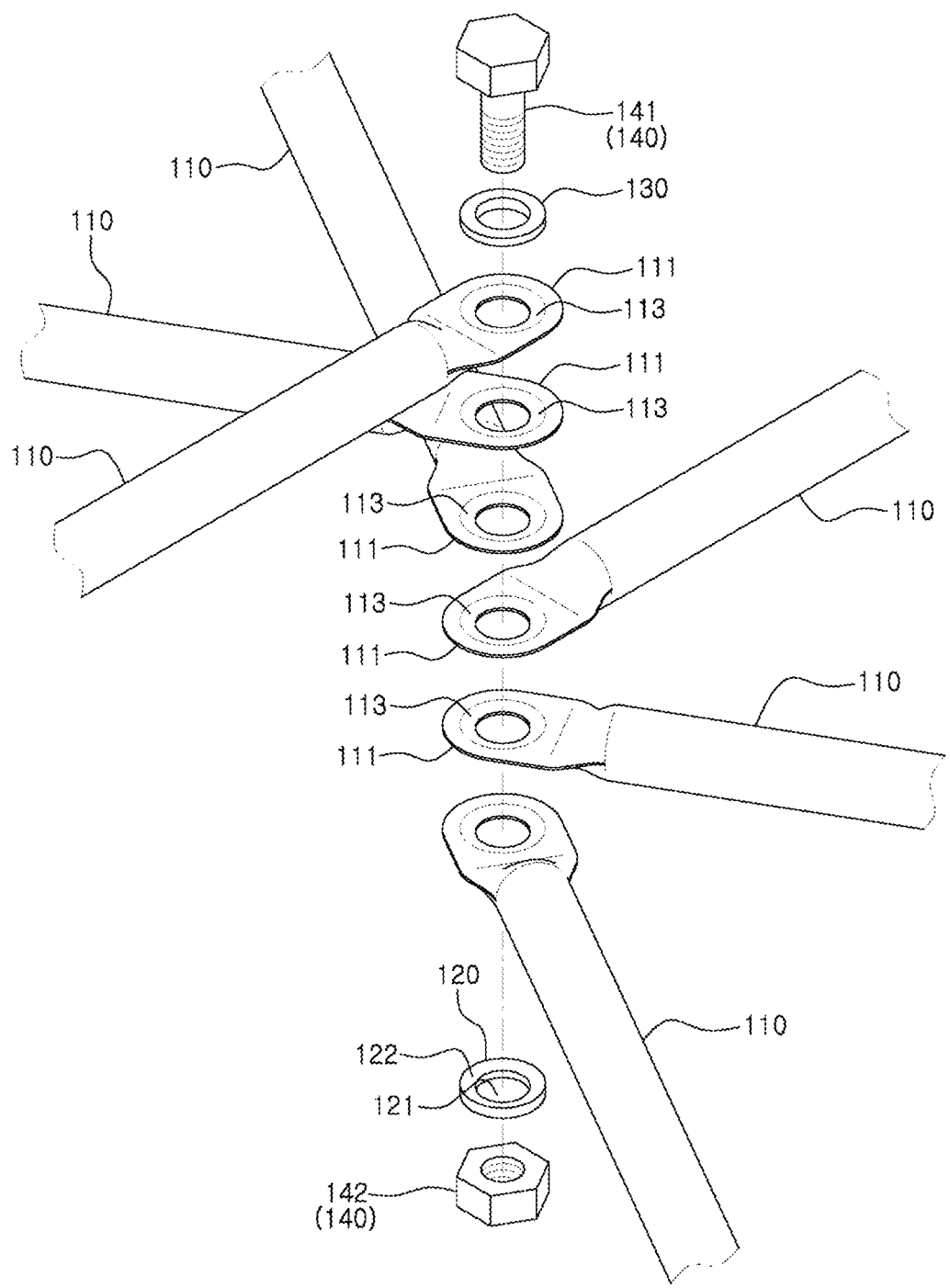
FIG. 8 is a perspective view showing a state before a plurality of truss structure members according to the preferred embodiment of the present invention are coupled.

FIG. 8 is a perspective view showing a state before a plurality of truss structure members according to the preferred embodiment of the present invention are coupled.

Figure 9:
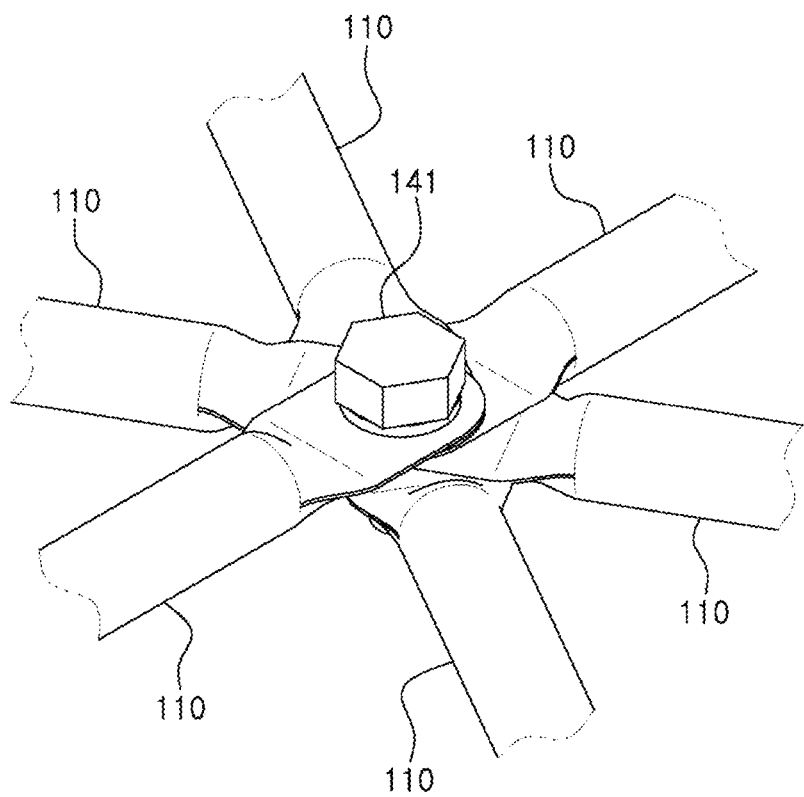
FIG. 9 is a perspective view showing a state in which the truss structure members according to the preferred embodiment of the present invention are coupled.

FIG. 9 is a perspective view showing a state in which the truss structure members according to the preferred embodiment of the present invention are coupled.

Figure 10:
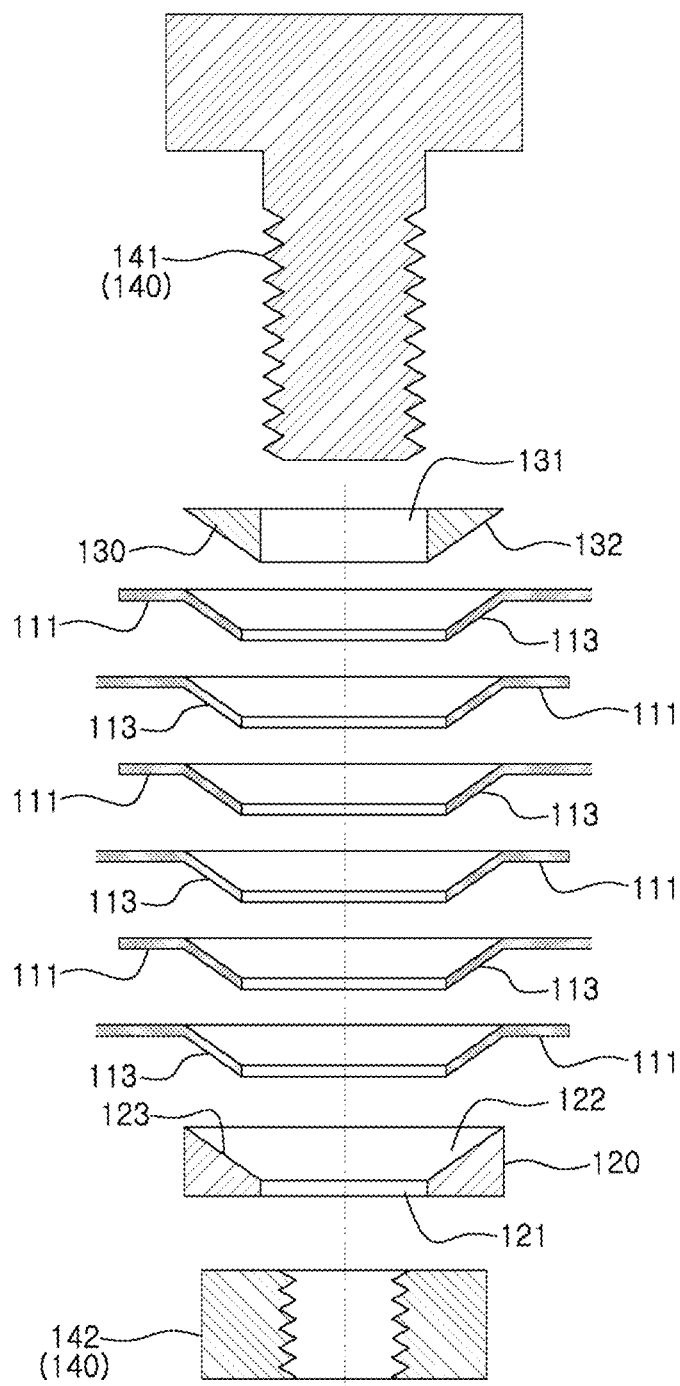
FIG. 10 is a sectional view showing a state before the truss structure members according to the preferred embodiment of the present invention are coupled.

FIG. 10 is a sectional view showing a state before the truss structure members according to the preferred embodiment of the present invention are coupled.

Figure 11:
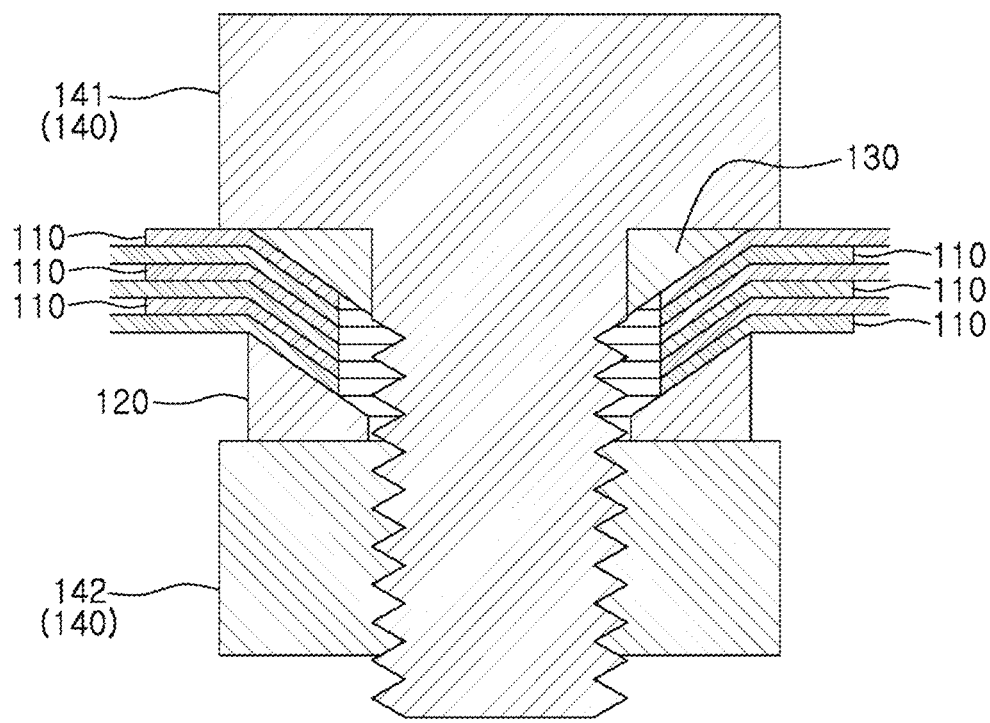
FIG. 11 is a sectional view showing a state in which the truss structure members according to the preferred embodiment of the present invention are coupled.

FIG. 11 is a sectional view showing a state in which the truss structure members according to the preferred embodiment of the present invention are coupled.

Figure 12:
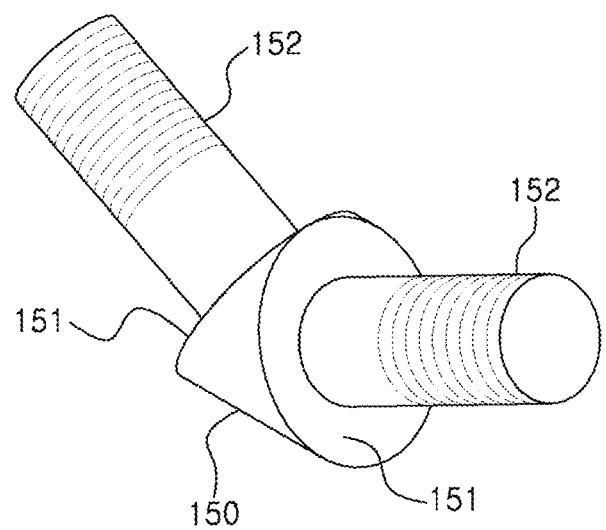
FIG. 12 is a perspective view of a connection member according to the present invention.

FIG. 12 is a perspective view of a connection member according to the present invention.

Figure 13:
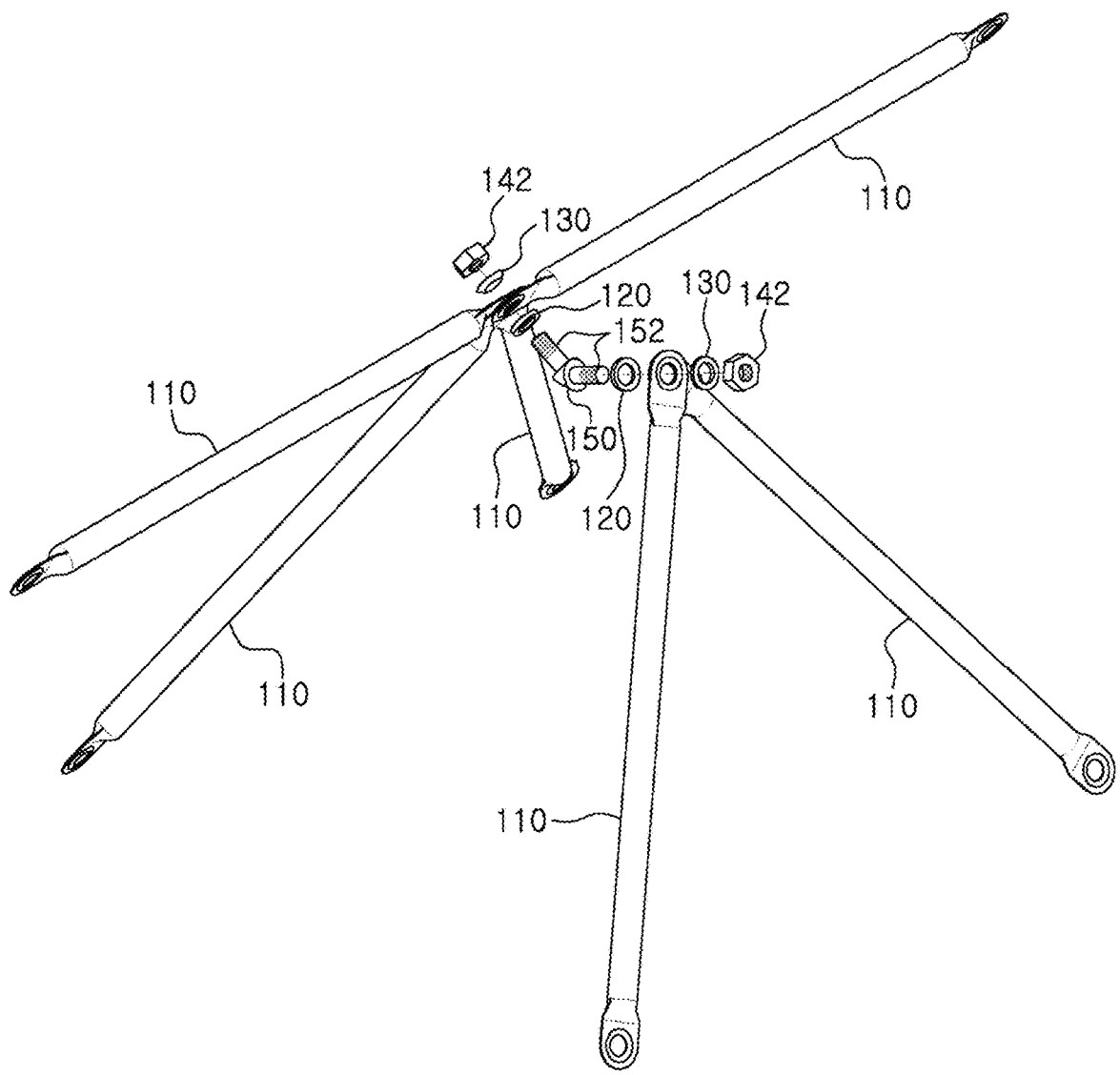
FIG. 13 is a perspective view showing a coupling structure between the connection member and the truss structure members according to the present invention.

FIG. 13 is a perspective view showing a state before coupling between the connection member and the truss structure members according to the present invention.

Figure 14:
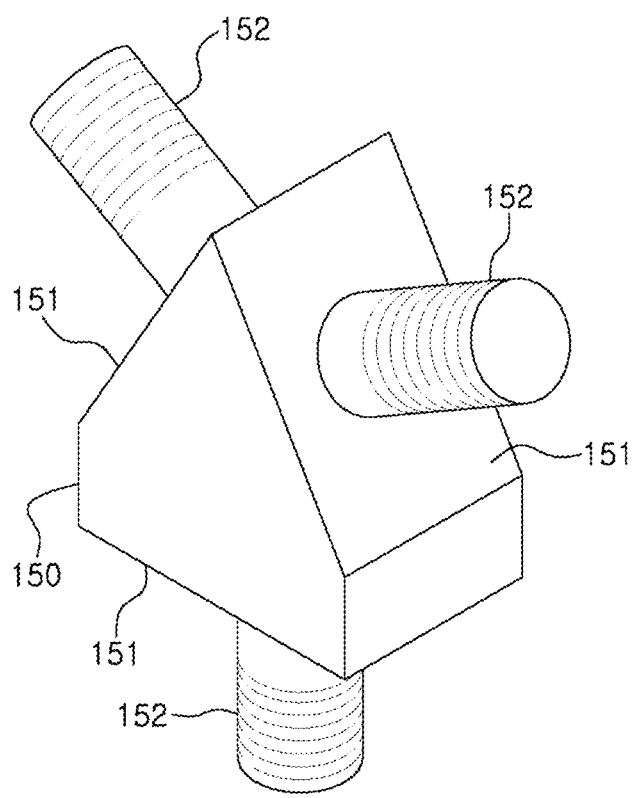
FIG. 14 is a perspective view of another connection member according to the present invention.

FIG. 14 is a perspective view of another connection member according to the present invention.

Figure 15:
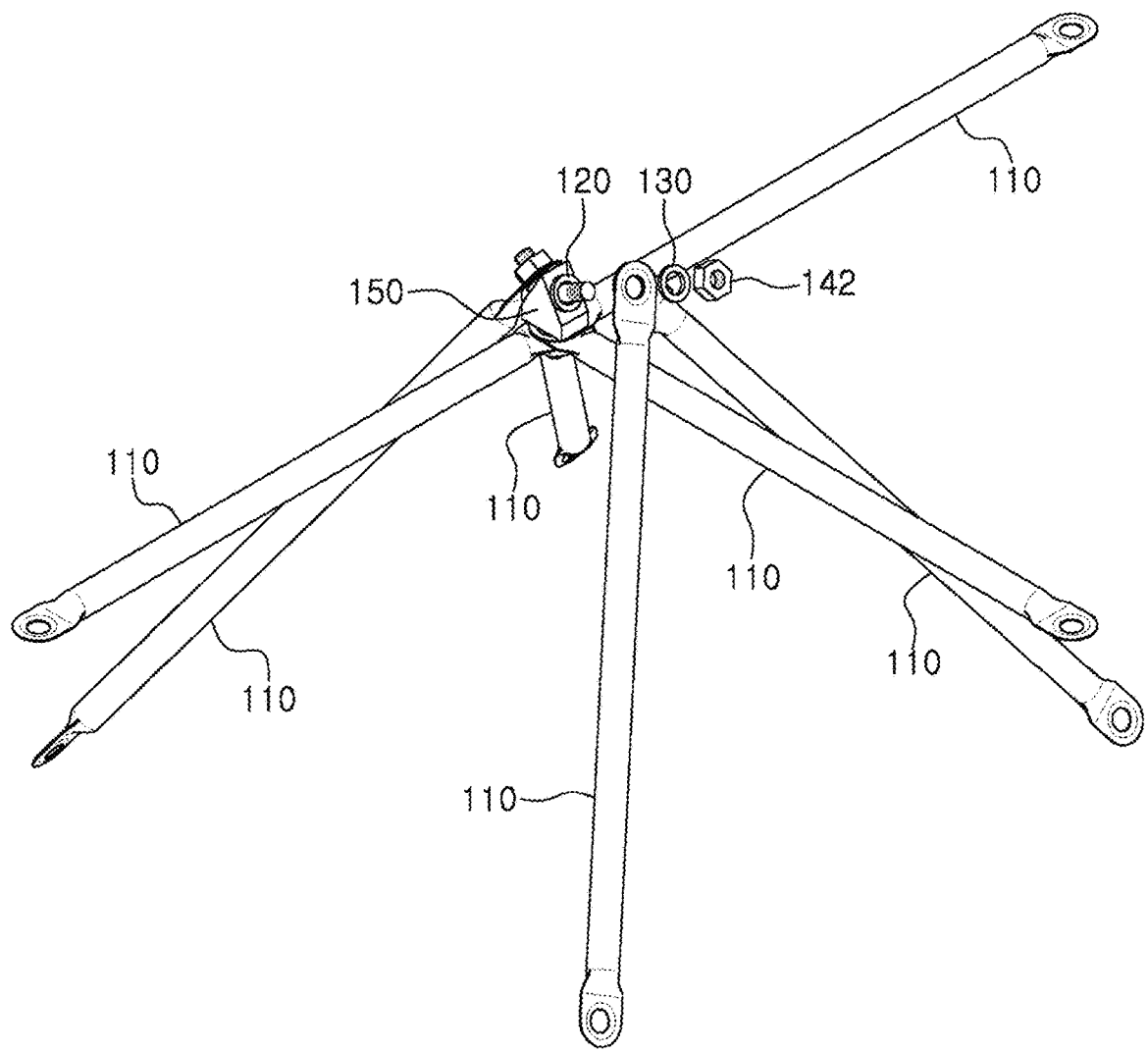
FIG. 15 is a perspective view showing a coupling structure between another connection member and the truss structure members according to the present invention.

FIG. 15 is a perspective view showing a coupling structure between another connection member and the truss structure members according to the present invention.

A plurality of truss structure members 110 according to the present invention are coupled together to form a predetermined shape, thereby constructing small truss structures such as greenhouses or livestock houses and large truss structures such as piers, in which tapered extension portions 113 formed on the truss structure members 110 are overlapped and coupled with each other when the truss structure members 110 are coupled, so that clearance may be prevented from occurring at a connection portion between the truss structure member 110 and the truss structure member 110, and a stress may be prevented from concentrating on a specific site.

In addition, the truss structure member 110 according to the preferred embodiment of the present invention is formed in a bar shape having a certain length, and formed at one end or both ends thereof with a flange portion 111 having a flat plate-shape structure, in which an assembly hole 112 passing through the flange portion 111 is formed in a center of the flange portion 111, and a tapered extension portion 113 is formed around the assembly hole 112.

The tapered extension portion 113 has a ring structure extending around the assembly hole 112, and has a sectional surface shaped to protrude with an inclination from vicinity of the assembly hole 112 toward an inside of the assembly hole 112 so as to be an overall conical shape, thereby gradually reducing an opening area of the assembly hole 112.

According to the above tapered extension portion 113 formed in the cone shape, an inclined outer surface 113a comes in close contact with an inclined inner surface 113b of a tapered extension portion 113 formed on another truss structure member 110.

According to the above structure, the inclined inner surface 113b of the tapered extension portion 113 comes into close contact with the inclined outer surface 113a of the tapered extension portion 113 formed on another truss structure member 110.

Accordingly, the tapered extension portions 113 formed on the flange portions 111 are overlapped and coupled to each other when the truss structure member 110 and the truss structure member 110 are coupled to each other, and the tapered extension portions 113 coupled to each other, so that the inclined outer surfaces 113a and the inclined inner surfaces 113b come into close contact with each other without a gap, thereby preventing clearance from occurring between the truss structure member 110 and the truss structure member 110.

The truss structure member 110 as described above may be manufactured by pressing an end of a circular pipe into a flat structure to form a flange portion 111, and punching and processing an assembly hole 112 in a center of the flange portion 111, in which vicinity of the assembly hole 112 is deformed into a shape of a tapered extension portion 113 when the assembly hole 112 is punched.

FIG. 3 shows a dome-shaped truss structure constructed using the truss structure members according to the present invention. FIG. 4 shows a rectangular truss structure constructed using the truss structure members according to the present invention. FIG. 5 shows a triangular pillar-shaped truss structure constructed using the truss structure members according to the present invention.

The structure according to the present invention is constructed using the truss structure members 110 as described above. A plurality of truss structure members 110 may be expanded while repeatedly forming a triangular structure, so that a structure having a predetermined shape is formed.

Meanwhile, in the process of coupling a truss structure member 110 to another truss structure member 110 to form the structure, the structure may further include a first support member 120 and a second support member 130 for supporting the tapered extension portion 113 protruding from the flange portion 111 to allow the truss structure members 110 to be more stably coupled.

The first support member 120 comes into close contact with the inclined outer surface 113a of the tapered extension portion 113 while accommodating the tapered extension portion 113 protruding from the flange portion 111 to support the tapered extension portion 113, and has a ring structure formed in a center thereof with a hole 121 through which a fastening tool 140 passes, in which a support groove 122 into which the tapered extension portion 113 is inserted is formed to be connected to a center of one side of the hole 121.

In addition, the support groove 122 is recessed into a conical structure to form an inclined first corresponding surface 123 coming into close contact with the inclined outer surface 113a of the tapered extension portion 113.

The first support member 120 configured as described above is disposed on a side surface of the flange portion 111 so that the tapered extension portion 113 is inserted into the support groove 122.

The second support member 130 supports the inclined inner surface 113b of the tapered extension portion 113, has an overall conical shape, has a ring structure formed in a center with a hole 131 through which the fastening tool 140 may pass, and includes an inclined second corresponding surface 132 to come into close contact with the inclined inner surface 113b of the tapered extension portion 113.

Meanwhile, the hole 131 formed in the second support member 130 is formed to allow the second support member 130 to completely pass therethrough.

The second support member 130 is disposed on a side surface of the flange portion 111 so that the second corresponding surface 132 comes into close contact with the inner surface 113b of the tapered extension portion 113.

As a result, the first support member 120 and the second support member 130 are disposed to face each other with the flange portions 111 therebetween to support the tapered extension portions 113 from both sides, and fixed together with the flange portions 111 by the fastening tool 140.

In addition, the fastening tool 140 is composed of a bolt 141 and a nut 142, in which one of the first support member 120 and the second support member 130 may be integrally formed with a head of the bolt 141, and the other may be integrally formed with the nut 142.

In the process of constructing the structure by coupling the truss structure members 110 using the truss structure members 110, the first and second support members 120 and 130, and the fastening tool 140 that are configured in the above manner, a connection member 150 for connecting the truss structure member 110 and the truss structure member 110 to each other in a structure bent at a predetermined angle may be further included.

The connection member 150 is formed of a block including at least two flat surfaces 151 inclined in different directions, in which the number of flat surfaces 151 and the inclined direction or angle of the flat surfaces 151 may be manufactured differently depending on the number of truss structure members 110 to be connected and the connection direction or angle between the truss structure members 110.

In addition, a screw pillar 152, which passes through the assembly hole 112 of the flange portion 111 and is fastened to the nut 142, is integrally formed with the flat surface 151 formed on the connection member 150.

Meanwhile, FIG. 12 shows a structure of the connection member 150 including two flat surfaces 151, in which the two flat surfaces 151 are formed symmetrically with respect to a center of the connection member 150 to connect the truss structure members 110.

Meanwhile, FIG. 14 shows a structure of the connection member 150 including two three flat surfaces 151, in which the three flat surfaces 151 are arranged to be positioned at places corresponding to sides of a triangle to connect the truss structure members 110.

Hereinafter, a process of forming the structure by using the truss structure members 110, the first and second support members 120 and 130, and the connection member 150 according to the present invention will be described.

The structure according to the present invention, like general truss structures, is formed by coupling a plurality of truss structure members 110 to each other to repeatedly form a polygonal structure. The tapered extension portions 113 may be overlapped with each other when the truss structure member 110 and the truss structure member 110 are coupled to each other, and the overlapped tapered extension portions 113 may be firmly coupled to each other by fastening of the bolt 141 and nut 142 constituting the fastening tool 140, thereby preventing clearance from occurring between the truss structure member 110 and the truss structure member 110.

More specifically, in order to couple two truss structure members 110 according to the present invention, first, the two truss structure members 110 are arranged so that the flange portions 111 formed on the two truss structure members 110, respectively, come into close contact with each other. Herein, the structure members 110 are arranged such that the tapered extension portion 113 formed in one truss structure member 110 is inserted into the tapered extension portion 113 formed in the other truss structure member 110 to allow the two tapered extension portions 113 to be overlapped with each other.

Thereafter, the first support member 120 is disposed on one side of the flange portion 111 so that the tapered extension portion 113 protruding in one direction of the two flange portions 111 in close contact is inserted into the support groove 122 of the first support member 120; the second support member 130 is disposed on the other side of the flange portion 111 so that the second corresponding surface 132 of the second support member 130 is inserted into the tapered extension portion 113 so as to come into close contact with the inner surface 113b of the tapered extension portion 113; and to bolt sequentially passes the first support member 120, the assembly holes 112 of the two flange portions 111, and the second support member 130 and then is fastened to the nut 142, so that the two truss structure members 110 are coupled to each other.

In the above manner, the tapered extension portions 113 formed on the two truss structure members 110 are overlapped with each other, the first support member 120 and the second support member 130 are disposed on both sides thereof, the first support member 120 and the second support member 130 are pressed when the bolt 141 and the nut 142 are fastened, so as to tightly fix the two tapered extension portions 113 to each other, so that the two truss structure members 110 may be firmly coupled without movement.

Meanwhile, even when two or more truss structure members 110 are connected at one point as shown in FIGS. 8 to 11, a plurality of truss structure members 110 may be connected to each other in the same manner as described above.

On the other hand, in order to connect a plurality of truss structure members 110 by using the connection member 150 formed with two flat surfaces 151, the first support member 120 or the second support member 130 may be installed on the screw pillars 152 formed on the flat surfaces 151 of the connection member 150, respectively, in which the first support member 120 or the second support member 130 is installed so that the support groove 122 formed in the first support member 120 or the second corresponding surface 132 formed in the second support member 130 is positioned to face the flange portion 111 of the truss structure member 110 coupled to the connection member 150.

The following description will assume that the first support member 120 is installed on the flat surface 151.

When the first support member 120 is completely installed, one side of the flange portion 111 formed on the truss structure member 110 faces the flat surface 151, in which the truss structure members 110 are installed on the two flat surfaces 151, so that the screw pillars 152 of the connection member 150 pass the assembly holes 112 formed in the flange portions 111, respectively, while a posture of the truss structure member 110 is adjusted to insert the protruding tapered extension portion 113 into the support groove 122.

The number of truss structure members 110 installed on screw pillars 152 may vary depending on a shape of a target structure.

Thereafter, the second support member 130 is installed outside the truss structure member 110 installed on the screw pillar 152, in which the second support member 130 is installed so that the second corresponding surface 132 formed on the second support member 130 is inserted into the tapered extension portion 113 formed on the truss structure member 110.

Thereafter, the truss structure member 110 is fixed to the connection member 150 by fastening the nut 142 to the screw pillar 152 passing and protruding through the second support member 130.

In the above manner, the truss structure member 110 and the truss structure member 110 are connected to each other, or the truss structure member 110 and the truss structure member 110 are connected via the connection member 150, so that a predetermined structure is formed.

As described above, the truss structure members and the structure according to the present invention are the useful inventions because the fastening force is not relied merely on bolts and nuts to connect and fix the truss structure member 110 to the truss structure member 110, the truss structure member 110 and the truss structure member 110 are fixed in a sturdy structure without any clearance by coupling between the tapered extension portion 113 and the tapered extension portion 113 and coupling between the tapered extension portion 113 and the support members 120 and 130, and a stress is prevented from concentrating on a specific site by distributing a shock or load acting between the truss structure member 110 and the connection member 150 through the support member and the tapered extension portions 113, so that a structurally more stable truss structure can be implemented.

In the related art, a bolt for fastening the truss structure members together may receive a significant stress due to a shock or load acting on a joint of the truss structure members, and a stress may be concentrated as the bolt and the hole come into local contact with each other due to a gap caused by a tolerance between the bolt and the hole. In contrast, according to the present invention, a bolt has a purely fastening function only, and the tapered extension portion 113 formed around the assembly hole 112 provides a function of firmly coupling the truss structure members 110 to each other without tolerance, so that deformation of the truss structure member can be minimized, and economic feasibility can be ensured by enabling reuse after disassembly.

The present invention is not limited to the specific preferred embodiments described above, various modifications can be made by any person having skill in the art without departing from the gist of the invention as claimed in the following claims, and the modifications are within the scope of the claims.

The invention claimed is:

1. A truss structure member having an assembly hole with a tapered extension portion, the truss structure member comprising:
   a flange portion (111);
   an assembly hole (112); and
   a tapered extension portion (113),
   wherein the truss structure members are formed in bar shapes so as to be coupled to each other to form a truss structure having a predetermined form, the flange portion (111) having a flat structure is formed in at least one of opposite ends of the truss structure member, the assembly hole (112) through which a fastening tool (140) passes is formed in the flange portion (111), and the tapered extension portion (113) is formed around the assembly hole (112),
   wherein the tapered extension portion (113) has a ring structure extending around the assembly hole (112), and has a sectional surface shaped to protrude with an inclination from vicinity of the assembly hole (112) toward an inside of the assembly hole (112) so as to be an overall conical shape, in which an inclined outer surface (113a) of the tapered extension portion (113) comes in close contact with an inclined inner surface (113b) of a tapered extension portion (113) formed on another truss structure member (110), so that the truss structure members (110) are coupled to each other in a structure without clearance while the tapered extension portions (113) of the truss structure members (110) coupled to each other are overlapped with each other to form a truss structure.

2. A structure comprising:
   a plurality of truss structure members,
   wherein each of the plurality of truss structure members comprises:
   a flange portion (111);
   an assembly hole (112); and
   a tapered extension portion (113),
   wherein the truss structure members are formed in bar shapes so as to be coupled to each other to form a truss structure having a predetermined form, the flange portion (111) having a flat structure is formed in at least one of opposite ends of the truss structure member, the assembly hole (112) through which a fastening tool (140) passes is formed in the flange portion (111), and the tapered extension portion (113) is formed around the assembly hole (112),
   wherein the tapered extension portion (113) has a ring structure extending around the assembly hole (112), and has a sectional surface shaped to protrude with an inclination from vicinity of the assembly hole (112) toward an inside of the assembly hole (112) so as to be an overall conical shape, in which an inclined outer surface (113a) of the tapered extension portion (113) comes in close contact with an inclined inner surface (113b) of a tapered extension portion (113) formed on another truss structure member (110), so that the truss structure members (110) are coupled to each other in a structure without clearance while the tapered extension portions (113) of the truss structure members (110) coupled to each other are overlapped with each other to form a truss structure,
   wherein the plurality of truss structure members are coupled to each other to form a predetermined shape.

3. The structure of claim 2, further comprising:
   a first support member (120) formed in a center thereof with a hole (121) through which a fastening tool (140) passes, formed in a center of one side thereof with a support groove (122) recessed in a conical shape to form an inclined first corresponding surface (123) to come into close contact with an inclined outer surface (113a) of the tapered extension portion (113) so as to be formed continuously with the hole (121), and disposed on a side surface of the flange portion (111) so that the tapered extension portion (113) is inserted into the support groove (122); and
   a second support member (130) formed in a center thereof with a hole (131) through which the fastening tool (140) passes, formed in a cone shape to include an inclined second corresponding surface (132) to come into close contact with an inclined inner surface (113b) of the tapered extension portion (113), and disposed on a side surface of the flange portion (111) so that the second corresponding surface (132) comes into close contact with the inner surface (113b) of the tapered extension portion (113).

4. The structure of claim 3, wherein the fastening tool (140) includes a bolt (141) and a nut (142), and one of the first support member (120) and the second support member (130) is integrally formed with a head of the bolt (141), and an opposite one is integrally formed with the nut (142).

5. The structure of claim 2, further comprising:
a connection member (150) including at least two flat surfaces (151) inclined in different directions, in which each of the flat surfaces (151) is integrally formed thereon with a screw pillar (152) passing through the assembly hole (112) of the truss structure member (110) so as to be fastened to a nut (142), so that the connection member connects at least two truss structure members to each other.

6. The structure of claim 5, wherein wherein the two flat surfaces (151) are symmetrical with respect to a center of the connection member (150).

7. The structure of claim 5, wherein the connection member (150) includes three flat surfaces (151), in which the three flat surfaces (151) are positioned on sides of a triangle, respectively.

\* \* \* \* \*